(12) United States Patent
Jack

(10) Patent No.: US 9,449,721 B2
(45) Date of Patent: Sep. 20, 2016

(54) METHOD OF PROVIDING IMPACT IN VACUUM

(76) Inventor: Colin Jack, Oxford (GB)

(*) Notice: Subject to any disclaimer, the term of this patent is extended or adjusted under 35 U.S.C. 154(b) by 487 days.

(21) Appl. No.: 13/541,702

(22) Filed: Jul. 4, 2012

(65) Prior Publication Data

US 2014/0233687 A1    Aug. 21, 2014

(51) Int. Cl.
  *G21B 1/15* (2006.01)
  *G21B 1/19* (2006.01)
  *G21B 3/00* (2006.01)

(52) U.S. Cl.
  CPC . *G21B 1/15* (2013.01); *G21B 1/19* (2013.01); *G21B 3/006* (2013.01); *Y02E 30/16* (2013.01)

(58) Field of Classification Search
  CPC .......................................... G21B 1/03
  USPC ................... 376/102, 108, 120, 152
  See application file for complete search history.

(56) References Cited

U.S. PATENT DOCUMENTS

| 4,047,068 A * | 9/1977 | Ress et al. ............... 313/359.1 |
| 4,944,211 A * | 7/1990 | Rowan et al. .................. 89/8 |
| 5,051,582 A * | 9/1991 | Bahns et al. ................. 250/283 |
| 8,315,350 B2 * | 11/2012 | Sturt ............................. 376/108 |
| 2009/0310731 A1 | 12/2009 | Burke et al. | |

FOREIGN PATENT DOCUMENTS

GB    2047945 A    12/1980

OTHER PUBLICATIONS

Beuhler et al.:"Deuteron-deuteron fusion by impact of heavy-water clusters on deuterated surfaces", Journal of Physical Chemistry, vol. 94, No. 19, Sep. 20, 1990, pp. 7665-7671, USA ISSN: 0022-3654, XP-002640888.
Winterberg F.:"Production of Dense Thermonuclear Plasmas by Intense Ion Beams", Plasma Physics, vol. 17, pp. 69-77. Pergamon Press 1975. XP-002640889.
Winterberg F.:"On the Attainability of Fusion Temperatures under High Densities by Impact Shock Waves of Small Solid Particles Accelerated to Hypervelocities", Z. Naturforschg. 19a,231-239 [1964].
Proceedings of the Impact Fusion Workshop, National Security and Resources Study Center, Los Alamos, New Mexico, Jul. 10-12, 1979 http://www.osti.gov/scitech/servlets/purl/5841385.
The ignition of dense DT fuel by injected triggers, A. Caruso and V.A. Pais,1996 Nucl. Fusion 36 745 http://iopscience.iop.org/0029-5515/36/6/l06.

(Continued)

*Primary Examiner* — Sean P Burke
(74) *Attorney, Agent, or Firm* — Lambert & Associates; Gary E. Lambert; David J. Connaughton, Jr.

(57) ABSTRACT

In space, a linear accelerator firing charged pellets can be situated at a large distance from a target at which the pellets are aimed. The accelerator can fire a graduated-speed train of pellets over a period of seconds or longer which arrive at the target simultaneously, and impart a large pulse of energy. An accelerator of modest power can thus provide a pulse in the megajoule range, sufficient to ignite fusion. It is necessary to provide course corrections to the pellets, to bring them together with very high precision as they approach the target. An ideal siting is to place the accelerator at the Earth-Moon L1 or L2 Lagrange point, and the fusion target at a point on the surface of the Moon where the pellets will strike at grazing incidence, i.e. on a great circle intersecting the lunar poles. Length of the particle trajectory is over 60000 km.

11 Claims, 4 Drawing Sheets

(56) References Cited

OTHER PUBLICATIONS

Hypervelocity Microparticle Characterization, George C. Idzcrek, Aug. 4-9, 1996 http://www.osti.gov/scitech/servlets/purl/397131.
Cryogenic thermonuclear fuel implosions on the National Ignition Facility, Glenzer et al. Phys. Plasmas 19, 056318 (2012); doi: 10.1063/1.4719686, http://www.psfc.mit.edu/icf/Home%20Page/Papers/Glenzer_PoP-2012.pdf.
Guided Impact Fusion, Jack, 2009-2012, http://vixra.org/pdf/1112.0088v2.pdf.
Kinetic Fast Ignition Fusion, Jack, Oct. 13, 2014, http://vixra.org/pdf/1411.0012v1.pdf.

* cited by examiner (a)  (b)  (c)  (d)

(a)　　　　(b)　　　　(c)　　　　(d)

METHOD OF PROVIDING IMPACT IN VACUUM

BACKGROUND OF THE INVENTION

The possibility of igniting energy-generating fusion by impact, essentially by firing a bullet into a target at extreme speed ~1000 km/sec, was studied in the 1960s and 1970s. However, firing a bullet massing ~10 mg to that speed is extremely demanding. The most plausible method, then and now, is accelerating a charged bullet in a modified particle accelerator. Unfortunately the charge that can be placed on a macroscopic body is limited by self-repulsion, tending to cause both burst-apart and field effect evaporation of atoms from the surface. The acceleration and vibration a macroscopic body can withstand is also a limiting factor. Even the most optimistic estimates, using an ideal diamond as a 'bullet', put the necessary accelerator length at >100 km. An alternative is to use a cluster of microparticles (herein also referred to as particles or pellets) or heavy ions in place of a single bullet, which would reduce the accelerator length. Unfortunately multiple problems exist with this strategy, including the very high accelerator power that would be needed.

However, a fusion reactor for use in space can have design parameters that would be impracticable on Earth. If an extremely long vacuum gap is available, there is time for a stream of microparticles fired from a linear accelerator of relatively modest power to catch up into a cluster if given a small speed differential, with the first particles launched travelling the slowest and the last the most rapidly: the accelerator power needed scales inversely as the size of vacuum gap.

BRIEF SUMMARY OF THE INVENTION

As a specific example, as shown in FIG. 1, consider an accelerator at one of the Earth-Moon system's Lagrange points (1) about 62,000 km from the surface of the Moon (3), which fires a microparticle beam along a trajectory (4) aimed to graze the lunar surface at a point (2) on a great circle intersecting the Moon's poles. Transit time for the particles is about one minute. If they are fired over a 5-second period, with the firing speed varied from ~960 km/sec for the first particles to ~1040 km/sec for the last, all reach the target simultaneously. The accelerator requires only a few MW input power.

The particles must be steered by applying small course corrections en route. A first correction as they leave the accelerator is relatively straightforward. However much more accurate corrections must be made on arrival at the lunar surface. This is why a grazing angle is chosen: taking advantage of lunar topography, and siting both the first incoming course correction station and the reactor on 2 km high lunar mountaintops, a distance between the first incoming course correction station and the reaction site of about 100 miles is achievable.

The accelerator design is very similar to that of a linear accelerator for fundamental particles, but operating at a lower frequency as the particle speed is ~1/300 that of light. The inter-electrode gaps therefore do not act as RF resonant cavities, and a dielectric (non-conducting) wall design can be chosen. Breakdown is more prone to occur over the surface of an insulator than within the interior. An internal accelerator cross section like that in FIG. 2 may therefore be optimal, in which each conducting electrode 5 is mounted within an insulating tube 6 of substantially larger internal diameter. Thus the surface path length between the wires 7 and 8 to which alternate electrodes are connected (in a 2-phase design) can be several times larger than the inter-electrode gap. An appropriate material for the insulator is Teflon or Rexolite, and for the electrodes copper, molybdenum or tungsten polished to maximize their surface field breakdown strength. Accelerator length will be of the order of a few kilometers.

Typically, particles will transit the accelerator spaced 2 n electrode intervals behind one another if it is a 2-phase accelerator, 3 n electrode intervals behind one another if it is a 3-phase acclerator, etc., where n is an integer, typically 1. (However the accelerator might operate with a group of particles, rather than a single one, at each such position.) Typically, particles will emerge with relative speeds proportional to the longitudinal interval between them, so that all particles ultimately meet at the same instant.

Appropriate material for the particles will have high tensile strength and low density for maximum charge/mass ratio. It should be stiff so that it does not overheat due to flexure, as the electric field and therefore acceleration experienced cycles at the drive frequency of the accelerator, and either an insulator of high breakdown strength or a reasonably good conductor, so that the charge flow induced on its surface does not damage it. Plausible candidates include diamond, boron-$\alpha$, aluminium-lithium alloy, or even microspheres of an engineering plastic such as celazole with a thin surface coating of metal such as aluminium. The latter requires a longer accelerator, but has the advantage that if (in place of a conventional target of DT ice) a target of solid methane in which the hydrogen has been replace by deuterium and tritium is used, the average atomic weight of pellets and target can be made very similar, suppressing Rayleigh-Taylor instabilities.

The particles should preferably be given a positive rather than negative charge, as field effect electron emission becomes significant at a much lower voltage gradient than field effect evaporation. Whatever material is chosen, the smaller the particles, the higher charge/mass ratio they can tolerate: however obviously more particles are then required for a given total kinetic energy. Suitable particle size is likely to be on the general order of ~10 microns radius, with between 10000 and 1 million particles used.

Accelerator optimal frequency will be much lower than that of a fundamental particle accelerator, ~MHz rather than GHz. Commercially available options to provide this power supply include diacrodes, tetrodes, or MOSFET-based units in conjunction with air-core transformers to boost their output voltage.

As they approach impact with the target, the particles should be guided as precisely as possible into a close-packed array, for example resembling a crystal lattice. Ideal precision required is a small fraction of the particle size, preferably ~1 micron or better. While this is demanding, it can be attained with consecutively finer corrections analogous to a spacecraft's mid-course corrections. The limiting factor is precision of position measurement. This can be done by CCD camera pairs with microscope-style lenses sited by the beamline. Exposure is controlled by laser pulse: laboratory desktop lasers with pulse <1 picosecond, corresponding to particle movement 1 micron, are available. CCD chips can do useful onboard processing, but readout rates are limited to a few tens of megabytes/sec, so many cameras will typically be needed at each measurement station. The number of lasers needed is far smaller: a laser feeding a leaky optical fibre running parallel to the beamline can serve many cameras.

Particle steering is done by the particles passing close to or between rapidly switched electrodes, which can steer them laterally in any direction and/or slightly alter their speed. Solid state power switches operating at tens of GHz are now available, so a relatively small number of electrodes can perform course corrections on thousands or even millions of particles as they pass. (An alternative to electric fields provided by electrodes is electromagnetic fields generated by rapidly switching current through short antenna-like wires.)

The particles require to be maximally charged for acceleration. Subsequently, mutual repulsion as they draw closer to one another is preferably minimised. The particles require only modest charge to be steered by successively smaller course corrections, so they can be progressively discharged, e.g. by passing through an electron beam or close to a hot or cold cathode after each course correction point, ultimately to zero.

The most easily achievable fusion reaction is deuterium-tritium. Because tritium does not occur naturally, it is desirable that as far as possible, all neutrons produced should be captured by lithium nuclei to bred more tritium. It is also desirable to minimize wear on the reaction chamber walls. A suitable arrangement is shown in FIG. 3 (necessarily not drawn not to scale: actual pellet number will typically be thousands, each ~20 μm diameter). A sacrificial projectile (9) is fired into a reaction chamber (10) whose walls are protected by a 'waterfall' (11) of lithium or a lithium compound. The target (12) is, at the moment of impact, within the sacrificial projectile which has entered the reaction chamber in a direction substantially parallel to the particles (13). The projectile has a hole (14) which permits passage of the pellets to strike the target. The projectile can itself be wholly or partly made of lithium. Also shown are the vacuum pipe (16) from which the pellets emerge and a projectile loading barrel (17) containing the next projectile (18). For continuous power generation, several projectiles are fired in per second.

The melt from the reaction chamber is circulated through a heat exchanger (e.g. by electromagnetic pump) to extract its thermal energy: the projectile material is extracted for recycling, as new projectiles must continuously be made. Tritium is also extracted.

It is important to preserve a good vacuum behind the projectile. As the projectile proceeds into the chamber (10) any tendency of gas or plasma from within to escape via any gap between the sides of projectile and its enclosing tube to contaminate the vacuum behind the projectile is reduced or eliminated by the outer walls of the projectile being indented with one or more circumferential cavities (19) which act as traps for such escaping material. The projectile can easily be made sufficiently cold that the cavities (19) additionally act as cold traps for such escaping material.

As 100% capture efficiency is impossible, there can never be quite enough neutrons produced from DT reactions to replenish the tritium. To close the cycle, some DD reactions are therefore desirable, which produce both tritium directly and extra neutrons. This can be arranged by raising the impact speed, hence effective collision temperature, and/or as shown in FIG. 4 by packing material (20) richer in deuterium round the central DT target (21), optionally enclosed in a shell of denser material (22) to increase the confinement time: the outer shell has a hole (23) to permit entry of the particles.

While the above design is described as for space conditions, it is of course possible to implement it on Earth provided that a vacuum tube is provided through which the pellets pass as they travel from accelerator to target. It is possible to provide a perfectly straight line up to several hundred kilometers long on Earth by choice of suitable terrain, tunnelling, stringing a pipe between a coastline and an island with a deep-water trench in between, etc. It is also possible to deflect the course of the particles with electric or magnetic fields, so the vacuum tube can be bent to match local topography and the Earth's curvature. It is also possible to shorten the distance between the accelerator and the target to a more convenient value at the cost of increasing the power of the accelerator.

DETAILED DESCRIPTION OF THE INVENTION

It might be thought that the 'virtual bullet' formed by the coalescing particles will be less dense than a normal solid of the same material, e.g. if the particles are perfect uniform spheres then at least by the ratio of the spherical packing fraction ~0.74, and less than that if allowance is made for inevitable inaccuracies in their shape, position and size. However as the back layers of the bullet are travelling faster than the forward layers, the bullet will compress to many times the normal density of the raw material as (or just before or after) it strikes the target.

Figure 1:
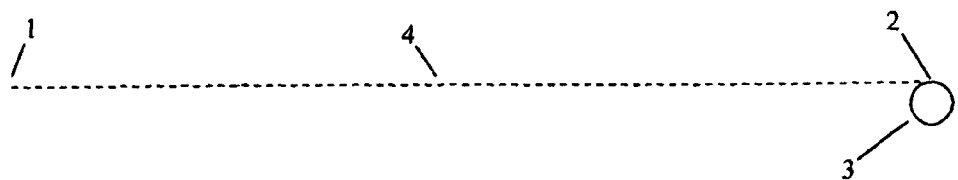
FIG. 1 shows an accelerator at one of the Earth-Moon system's Lagrange points firing a pellet beam along a trajectory aimed to graze the lunar surface.
Figure 2:
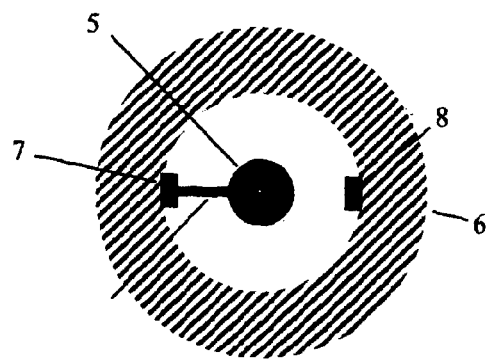
FIG. 2 shows an accelerator cross section with conducting electrode mounted within an insulating tube of substantially larger internal diameter.
Figure 3:
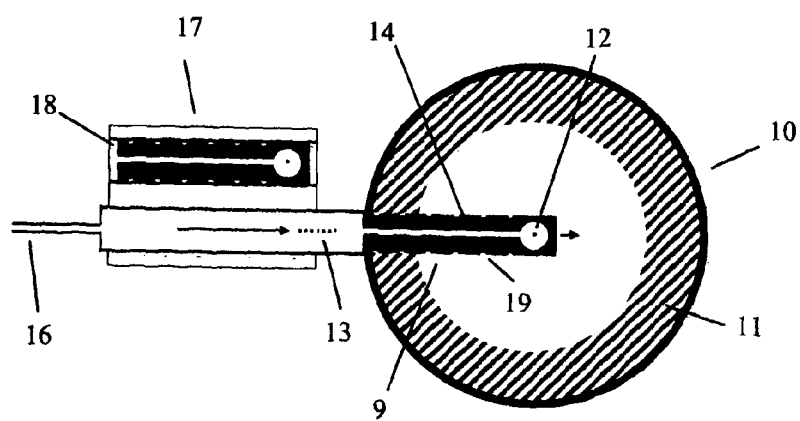
FIG. 3 shows a reaction chamber whose walls are protected by a 'waterfall' of lithium (hatched) into which a sacrificial projectile is fired: pellets proceed in the direction indicated by the arrow to strike a target within said projectile.
Figure 4:
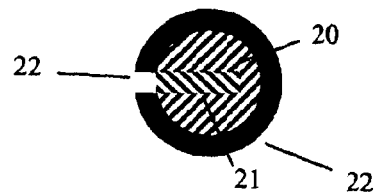
FIG. 4 shows a central DT target surrounded by material richer in deuterium, enclosed in a shell of denser material which has a hole to allow passage of pellets.
Figure 5:
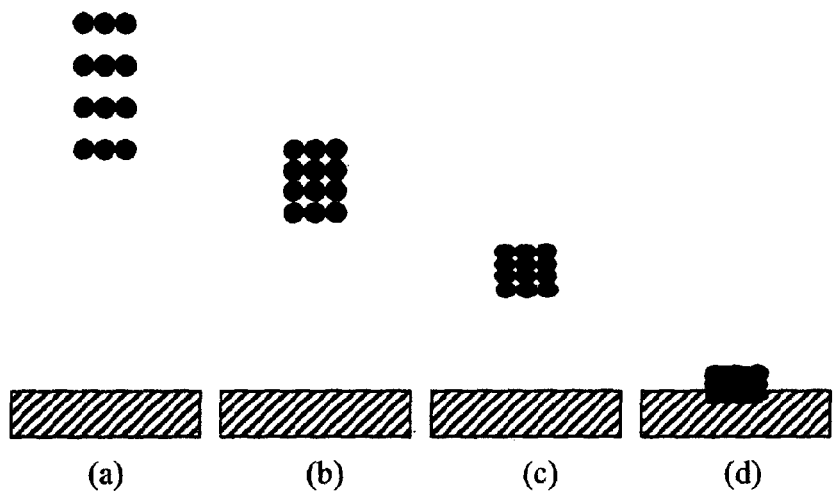
FIG. 5 shows pellets (solid circles) en route to striking a target (hatched): parts (a), (b), (c), (d) show consecutive timesteps.
Figure 6:
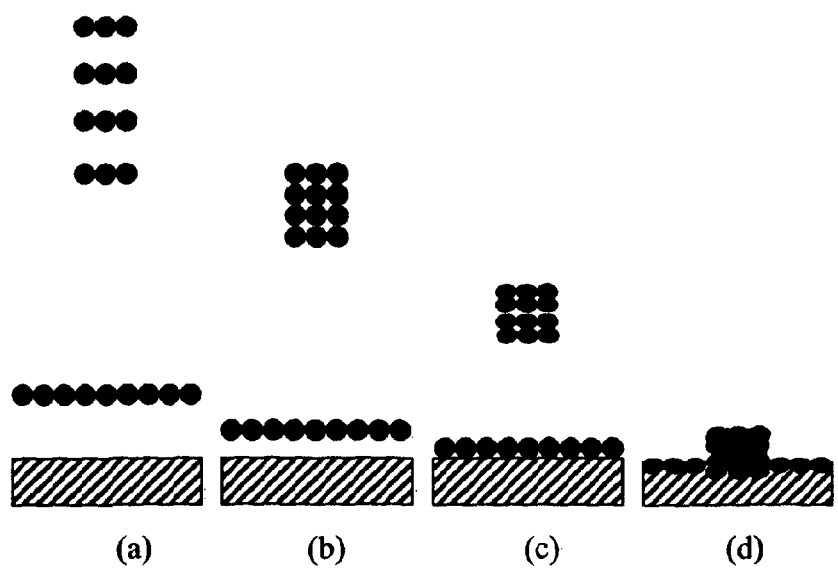
FIG. 6 shows pellets (solid circles) en route to striking a target (hatched): parts (a), (b), (c), (d) show consecutive timesteps.
Figure 7:
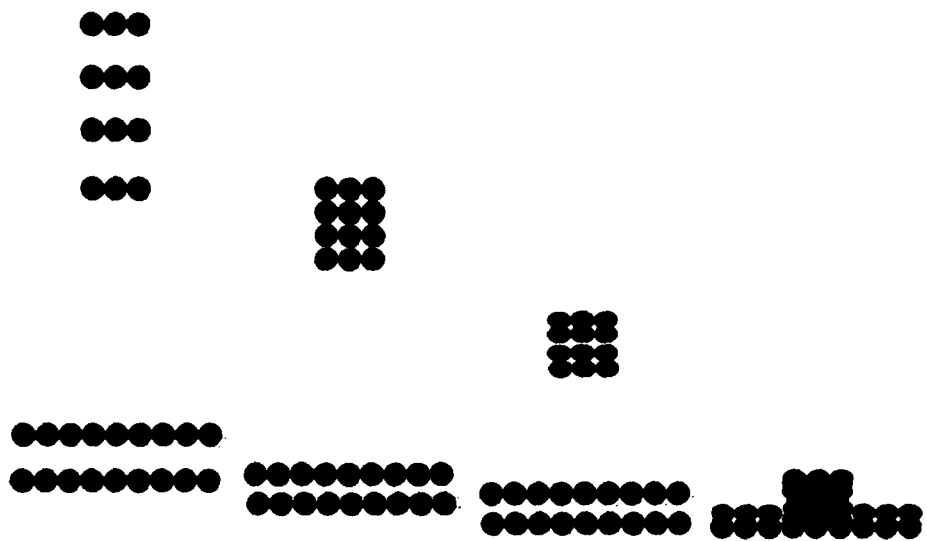
FIG. 7 shows pellets (solid circles) en route to striking a target of slower moving pellets: the four columns from left to right show consecutive timesteps.
Figure 8:
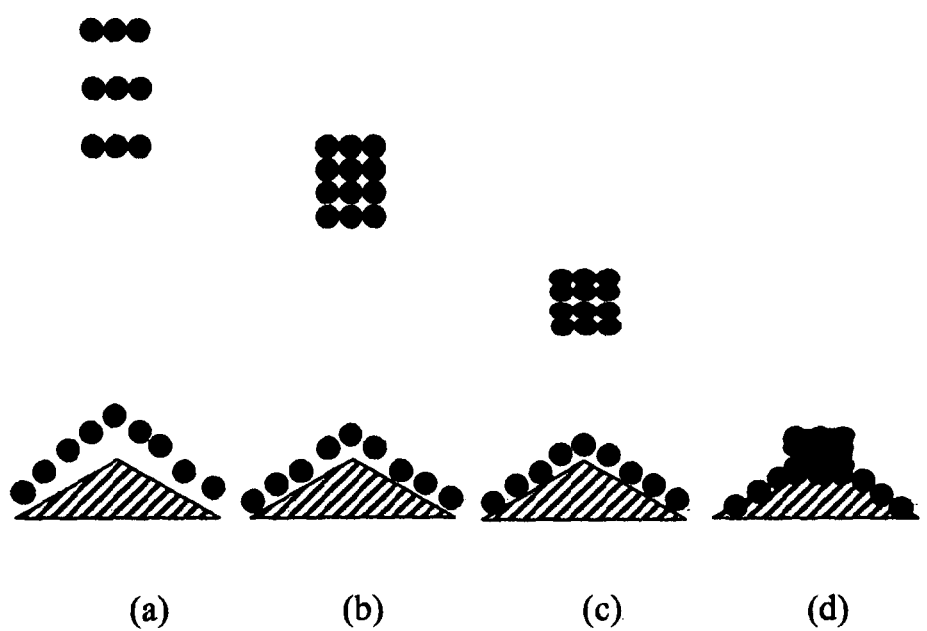
FIG. 8 shows pellets (solid circles) en route to striking a target (hatched): parts (a), (b), (c), (d) show consecutive timesteps.
Figure 9:
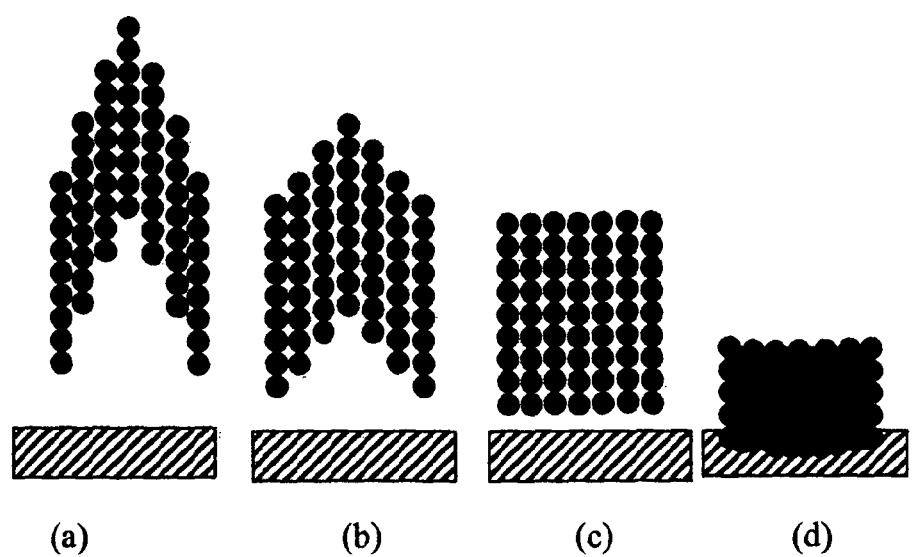
FIG. 9 shows pellets (solid circles) en route to striking a target (hatched): parts (a), (b), (c), (d) show consecutive timesteps.

In each of FIGS. 5-9, parts (a), (b), (c) and (d) show particle positions (black circles) at consecutive timesteps en route to striking the target (hatched). For clarity the drawings are necessarily not to scale, with particle size vastly exaggerated, and particle number vastly reduced, compared to a likely implementation. FIG. 5 shows a basic configuration: particles come together to form a precompressed bullet before striking the target. FIG. 6 shows a variant in which additional particles, fired first at lower speed, precompress the target before the bullet strikes it. FIG. 7 shows a variant in which there is no pre-positioned target: rather additional particles, fired earlier at lower speeds, actually constitute the target. FIG. 8 shows a variant in which the prepositioned target is not flat but conical, so that it is precompressed sideways as well as vertically before the bullet strikes it. FIG. 9 shows a bullet whose central part travels fastest, so first ignition occurs at the centre.

It will be appreciated that almost infinite variations on the theme are possible. For instance the particles may be of differing sizes, shapes and made of different materials, likewise the target (if a prepositioned target is provided) may consist of layers of different materials. For example, the ensemble may provide back and front portions of dense material constituting a 'hammer' and 'anvil', between which the material to be fused is sandwiched.

Diamond dust; chopped graphite whiskers; chopped carbon fibres; ceramic microspheres; frozen deuterium; frozen deuterium-tritium compound; frozen methane in which the hydrogen atoms have been replaced by deuterium and/or tritium; an engineering plastic in which the hydrogen atoms have been replaced by deuterium and/or tritium; tungsten; uranium: are all examples of constituents which could be used in the particles and/or target. The particles can comprise outer shells of one material containing a second material within, e.g. the second material might be helium-3.

During their transit, the particles may have their charge neutralised (e.g. by spraying electrons on to them) so that they do not repel one another as they come together. Electron sprays might combine the functions of charge neutralisation, electron microscopy for precise position measurement, and adjustment of particle trajectory by momentum exchange. In a terrestrial system, particles may equally conveniently be measured and adjusted at any point in flight, not just near the accelerator or target ends of the system.

Note that relative (rather than absolute) accuracy of the particle positions is required. This is easy to obtain, as all particles can pass through the same sensors. If a prepositioned target is provided, the target may be adjusted to precisely the correct position for impact as the particle cluster approaches, or vice versa.

Note that the guidance system avoids any disruptive premature collisions between particles occurring.

Obvious applications include power generation, spaceship propulsion, asteroid propulsion.

The Tetris method may be suitable for separating compression and ignition, which is difficult to do by either laser or with a single physical bullet, for two reasons: A Tetris accelerator can, at no extra cost, fire many slower pellets immediately preceding the higher energy ignition pulse, with all arriving near-simultaneously. The extra pellets can supply energy and/or momentum for target precompression. As the ignition bullet is made by a train of pellets of differing speed coming together, it can easily be both precompressed to high density, and given a very high mass per frontal area, like an armour-piercing bullet. Thus it can punch through and deposit most of its energy at the heart of even a dense target plasma.

Allowance must be made for inefficiencies. In laser compression hydrodynamic inefficiency—evaporating material from the outside of the pellet to compress the central fuel by rocket-like reactive force—reduces the useful kinetic energy to 10% of radiative energy supplied. Pellet impact is potentially more efficient. However for ignition the available energy must be calculated in the centre-of-mass frame of the bullet and an equal mass of target, reducing the available energy by half. Also, if the bullet has mean atomic mass equal to that of the target, half the energy will be wasted as internal heating of the bullet itself; if on the other hand its atomic mass is higher than the target's, energy is lost to Rayleigh-Taylor instabilities. Further energy is wasted as the bullet punches through low-density plasma en route: not all its kinetic energy is donated at the ideal point. For compression the impact method could in principle be extremely efficient. However pellets provided at near-ignition speed are moving much too fast to impart momentum directly to the target, and can probably not be spread sufficiently uniformly. A solution is to make them collide with a strip of foil which acts as a hohlraum. Radiation from the hohlraum evaporates a backing material to accelerate DT fuel, perhaps into a conical pit within a surround of dense metal, in much the same way that a spherical pellet is compressed by laser. As long as the gap between hohlraum and DT backing material is at least a few times greater than any inhomogeneities in the pellet wavefront or the foil itself, very uniform compression will be achieved.

The accelerator operates on the same principle as a fundamental particle accelerator. However because the pellets travel at less than 1% of light speed, the drive frequency can be much lower. Tiny cheap MOSFET transistors thus can be used in place of klystrons for power conditioning, with small air-core (or vacuum-core) transformers to boost their output voltage. The electrodes do not form RF resonant cavities, and can be simple disks of metal mounted within a Teflon tube. Three-phase electrodes can be used (or even more phases) so that individual pellets ride a 'wave' of near-constant electric field. This minimizes vibration and induced surface current, so the pellets can be made from any reasonably strong material, e.g. plastic microspheres.

At the start of the accelerator, pellets could be injected from a 'waterfall' which falls between a pair of electrode plates. Individual pellets are 'zapped' with electrons from a steerable cathode ray tube beam (or positive ions from an ion gun) to adjust their time and speed of entry into the accelerator.

As the pellets approach the target shuffling may be necessary because while the direction of every pellet can be adjusted, its longitudinal position cannot. It will therefore be necessary to reallocate pellet positions dynamically in order to form a close-packed array as required. Any surplus pellets may be discarded by turning them away to the side. It is this dynamic allocation which makes 'Tetris' an appropriate system name.

The ideal fusion reactor requires no rare or radioactive isotopes as input, and produces no radioactive isotopes as output. Basic DT fusion as above does not achieve this goal. Although the blast chamber could in principle be surrounded with pure elements which do not produce unwanted isotopes under neutron bombardment, for continued operation it is necessary to breed tritium from lithium. The DT reaction itself does not yield sufficient neutrons for this, so it is normally assumed that fissionable isotopes must be included in the blast chamber surround, which intentionally multiply up the number of neutrons available to react with the lithium. However a Tetris reactor can easily be scaled up to much higher energies. At a temperature 10× higher than that for DT burn, the reaction cross-section becomes large enough to support DD direct burn, with the reactions DD→Helium-3+n and DD→tritium+p taking place at approximately equal rates. So by raising the reaction temperature and including a higher proportion of D to T, the Tetris reactor can manufacture sufficient tritium for its own use. (Helium-3 is not radioactive.) More ambitiously, the reaction Boron-11+p→Helium-4 might be achievable. This is the ideal aneutronic reaction, but very challenging first because it would require enormous densities, and second because energy output ratio is relatively modest: indeed unless an initial degenerate compressed plasma can be produced, the electrons take up too much energy to make self-propagating fusion burn possible. For a Tetris system the outlook is much better. The temperature of 550 keV at which the reaction cross-section is maximized is achievable, vastly lowering the density requirement. The efficiency with which Tetris turns electrical into kinetic energy allows net energy generation with a very modest output ratio. And because a Tetris machine can produce pellets with any speed distribution required, varied over the pulse, gentle piston-like precompression with minimum heating (as required to produce a degenerate plasma) is possible. (If very much slower pellets are required for compression than ignition, for example to perform without a hohlraum-type membrane, either by direct momentum transfer by impact with the target or by colliding pellets with one another to heat them and so produce radiant energy to power compression, separate accelerators can be used for the purpose. Since these secondary accelerators can piggyback on the buildings, vacuum tubes and trajectory adjustment systems of the primaries, cost will be modest.) A pair of opposed Tetris accelerators firing boron pellets into a central hydrogen target may well be optimal. Boron-a pellets are strong and can be given a high charge-mass ratio. All mass used is actually involved in the fusion, and the centre of mass is stationary with respect to the frame of the accelerators, so hydrodynamic efficiency is close to 100%. The accelerators used do not necessarily have to face one another exactly, so problems with curvature of the Earth's surface are minimized.

It may be possible to fit multiple parallel accelerator tubes within the same building. Tubes need only be separated by only a few times their electrode spacing to minimize mutual interference. Spare tubes can be provided. A worst-case pellet disintegration damages only one tube; the system can continue functioning while it is replaced. The accelerators can be aimed so that the beams gradually converge, initially entering small individual vacuum tubes which converge to become a single tube nearer the target.

An angled mirror can be used so that a single camera can capture a stereo image. The unit can measure particle position in all dimensions to ~0.1 micron. In practice a cheaper laser giving longer pulses can probably be used, with streak analysis to determine along-axis position.

The cameras can also assess the size of each particle (shape, spin, mass and mass/charge ratio can also be measured independently if desired, e.g. by measuring the charge and also the magnitude of deflection by a known magnetic field). The relative positions and timings of the particles can be adjusted, and their intended destinations within the final bullet interchanged if necessary, to ensure that the density of the final bullet is almost perfectly uniform despite variations in individual particle size etc. This is analogous to the computer game Tetris.

A possible advanced fusion target is hydrogen-boron, which produces no neutrons, hence no radionucleides. This reaction has resonance peaks. Given the fine-tuning possible for the virtual bullet, which can be precompressed, shape-tailored, and given any desired internal velocity distribution, the peaks may be usable. The pellets are assumed to be boron, an ideal material which is strong and very hard even as a pure element: compounds such as boron carbide are even tougher.

The target may be boranes, boron-hydrogen compounds which are stable at low temperature. An effective fusion burn wave can be generated in a proton-boron plasma providing the plasma is degenerate, i.e. not too hot in relation to its density. The intrinsic ability of a Tetris accelerator to provide a first wave of slower pellets carrying high momentum relative to their energy, which arrive at the target simultaneously with the faster ignition pellets, is perfectly suited to providing such piston-like compression. Note that energy several times greater than the ignition pulse is automatically available for target precompression, by firing lower-speed pellets before the high-speed ignition burst.

Target compression may optimally be performed by pellets travelling very much slower (orders of magnitude slower) than the ignition pellets. The ignition pellet accelerator would be capable of providing particles at the very slow speed appropriate, perhaps a few tens of kilometers per second, by leaving all except the first few electrodes switched off, but the impulse would be modest. A much larger impulse can be provided cheaply using a small ancillary accelerator which shares its expensive components—building, vacuum tube, insulation and course correction systems—with the main accelerator. Up to say 100 millisecond's worth of this machine's output can arrive at the target as a pulse: an output of just 20 MW can provide a 2 MJ compression pulse. To keep within the limits of the tweaking system, the pellet arrival rate should be no greater than that of the main pulse. The compression particles may therefore be of order one million times as massive as the ignition particles: e.g. 100× the diameter, 50 µm.

The ancillary accelerator will be around one-tenth the length of the main one, but a negligible fraction of its switch cost. Although the compression pellets each carry several thousand times the momentum of the ignition pellets, they also carry 100× the charge and remain within the effective vicinity of correcting fields for several hundred times as long, so the existing course tweakers can easily handle them. The speed ratio is so high that all compression pellets have cleared the final tweaker before the first ignition pellets arrive. A magnetic field is provided at a few points along the vacuum tube connecting accelerator and target to bend the compression pellet trajectories slightly upward, to prevent them falling too far under gravity.

As an alternative method of target compression, fast pellets may hit a front layer of material on the target which heats up and evaporates, pressing and compressing deeper layers. This 'rocket-like thrust' method whereby energy in the form of very fast particles heats material to cause propulsion at much lower speeds is analogous to laser-driven inertial confinement fusion, wherein the fast particles are however photons.

Compression may be performed by pellets, and heating at a point to cause ignition provided by other means, such as laser(s) or beam(s) of fundamental particles, atoms, etc. Or vice versa.

Fast and/or slow pellets may approach the target zone from opposite directions, or indeed from many directions. They may be fired from separate accelerators and/or have trajectories bent by passage through electric or magnetic fields. In this case there may or may not be a separate target: the pellets themselves may comprise all of the material to be fused.

Successive fusion reactions may take place at various points within a pipe, which may be long with a narrow internal diameter.

If fusion is ignited in pellets which continue to travel rapidly (for example by colliding pellets of markedly differing speeds) the rapid motion of the fusion source may help dispense the energy release (whether in the form of photons, neutrons, or other particles) along the length of the pipe so that no one portion of the pipe walls or equipment beyond is subject to damaging levels of heat, radiation, etc.

Development is greatly facilitated because optimisation of compression and ignition can be explored using software changes only to tailor the 'bullet', for example using a genetic algorithm to home in on effective patterns.

The diacrode's major limitation is that it a fixed frequency device. In the present application, about 20% launch speed variation is required. Using MOSFETs, this could be applied simply by steadily increasing the frequency during the period between the first and last pellet leaving the accelerator. With diacrodes, the solution is to switch in units at the fast end successively, resulting in sub-trains of pellets each a few meters long travelling at a uniform speed. After exiting the main accelerator, these sub-trains pass through a short run of MOSFET-controlled electrodes which are operated to speed up (or retard) pellets by differential amounts: e.g. from zero increment for the first pellet in each sub-train to a few meters per second for the last, so that each individual pellet now has a slightly different speed for perfect convergence as required.

At the low-speed end of the accelerator tube there will be a minimum acceptable pellet separation due to inter-pellet repulsion. In place of what would be the first few meters of the accelerator, a longer low-power leader section is therefore provided with fixed electrode separation and highly variable drive frequency. This leader section is continuously fed with pellets which are precharged to a moderate voltage and fired in at (say) 5 few km/sec. When the leader contains a line of all pellets required, the variable frequency electrodes then accelerate this line en bloc to (say) 50 km/sec, at which point it enters the main accelerator. During this process the pellet voltage is raised by offsetting the local electrode voltages to the required level: note that electrons can flow easily from a pellet to the electrode it passes through, though not vice versa, as the pellet acts as a discharge point source while the electrode surface is smooth. To feed the leader at 5 km/sec, pellets are released from a Pelletron-type Van de Graaff generator. This is a well known technology, except that normally pellets emerge from a source container at a chosen average rate rather than at precise intervals. Here this must be modified: a container with several orifices is used, but any pellet can be rejected just after its emergence is detected, e.g. by zapping it with an electron gun to remove its charge, or diverting it using a switched electrode. Most pellets are thus recycled, leaving just one per cycle to drop into the accelerator tube. (Note that the required rate is lower than the rate at which a modern bubblejet printer ejects ink droplets of comparable diameter.) The precise timing of those pellets which are allowed to fall into the accelerator can be adjusted with a smaller kick from the same electrodes used for rejection. A pair or larger group of pellets which happen to emerge from the same orifice simultaneously are always rejected. There will be occasional cycles when no pellet is available, because any Poisson distribution occasionally yields a value of zero, but these gaps can be closed up by in-flight shuffling as described elsewhere. Focussing to keep the pellets centered during acceleration can be provided by electric field, e.g. shaping the electrodes as cones to produce an inward radial field for part of each cycle. Magnetic lenses, e.g. quadrupole magnets as used in a fundamental particle accelerator, and/or active steering as described elsewhere in this document, can also be used e.g. to damp down lateral oscillations. Pellets can be strength-tested by charging them to slightly above operational voltage before firing. In-tube pellet failure is therefore unlikely. Any failure which does occur has the potential to become contagious. However worst-case energy release is 2 MJ, and the debris cloud kinetic energy reduces exponentially at each consecutive electrode it impacts: each electrode masses more than the entire pellet cloud, and its central hole constitutes <1% of its area. So damage will be very localised. The tube can be wrapped in a Kevlar blanket so that external equipment is not affected. Chicane traps can be incorporated at multiple points in the system: slight bends with lateral fields which divert pellets of exactly the correct charge/mass ratio into the next section, but allow other material to fly on into open ended 'dump tubes' in which the plasma from their impact is safely contained. The precise deflection of each pellet which passes successfully allows its exact charge to be monitored, and tweaked with an electron gun if necessary.

The tube connecting accelerator and target can contain a relatively soft vacuum by particle accelerator standards: it does not need to be housed in a building, and can comprise a simple pipe mounted on pylons or stilts. It can be given a much larger internal radius, say ~10 cm, than the maximum pellet deviation from the beamline, so that it can tolerate lateral displacements due to wind etc. of several centimeters, and so that its vacuum can be maintained by pumping from a limited number of points along its length.

Pellet position measurement near the target end is demanding because of the high rate of pellet flow past a given point, increasing to theoretical infinity at the collision point. Measurement stations comprise lines of paired cameras, with a pulsed laser providing light via a leaky optical fibre. Exposure is controlled by the laser, not by shuttering: inexpensive CCDs with a shutter rate ~50 Hz have a similar readout rate, ~10 Mpixel/sec, as expensive high capture rate cameras, and are capable of binary processing involving bit shifts, adds and reads (normally used e.g. for pixel binning) To avoid confusion from overlaps, pellet trajectories are spread, and timings chosen, so that each pellet imaged appears in a different part of a camera's field of view: for example a 1000×1000 field may be subdivided into 100 squares each of 100×100 pixels. The position of each pellet is reduced to an X,Y value for readout. Given that a readout delay of up to 20 µs is acceptable (corresponding to a downstream flight distance ~20 m) each camera pair can track ~100 pellets per pulse. The laser can be a standard laboratory desktop model providing ~10 µJ output pulses of duration <1 picosecond at repeat rate up to 2 MHz. A pellet moves only ~1 µm in 1 picosecond.

At the final correction the pellets can be given slight radial velocities, with dynamic allocation of placement to make the end product, the cylindrical virtual bullet, as neatly packed as possible, allowing for any 'missing pellet' gaps and also taking detected variations in pellet size into account if an imperfect monodisperse such as diamond dust is used: hence the Tetris system name. After the final correction station, a further electron gun reduces the pellet charge to zero.

The basic design assumes that all pellets follow the same beamline. By intentionally diverting the pellets into a number of parallel beamlines, the linear separation between pellets may be kept large enough that independent pellet tweaks even close to the impact point are possible.

The basic design uses small rapidly switched electrodes to tweak pellet trajectories. An alternative is to have the pellets pass through fixed strength fields, having reduced the charge on each pellet to a precisely controlled value to produce the course adjustment required, using an electron gun.

The severity of the flexure and heating encountered by the pellets during acceleration can be greatly reduced by the following strategy. The Tetris accelerator, with its large number of independently switchable MOSFETs, can easily provide multiple phases of drive voltage. In a strategy very similar to that used in coilguns, if consecutive electrodes cycle 120° out of phase, the accelerating force becomes approximately constant: the pellet rides a wave of constant gradient. If the pellet is small compared to the inter-electrode distance, it experiences a field which is to a good approximation both spatially and temporally uniform, and suffers virtually no vibration or induced current.

To feed pellets into the accelerator at a controlled rate, they could be mechanically preplaced in (e.g.) a 500×500 array on a plate. Pellets are charged via pins on which they sit above an electrode. To launch each pellet at the chosen instant, the charge on the electrode is switched from negative to positive. Plates can be removed and reloaded in alternation so the pellet supply is continuous.

If the pellets are monodisperse microspheres, they can come together into a close-packed array (e.g. as found in various crystal lattices). Even at maximum packing density there will be voids, however these will rapidly be filled as the spheres crush together at (or just before) target impact. To minimise seeding of Rayleigh-Taylor instabilities, these voids can be filled with smaller microspheres, or even with a quasi-fractal pattern of microspheres of different sizes.

If a non-monodisperse such as sieved diamond dust is used, dynamic reallocation of pellet terminal position by in-flight trajectory tweaking can aim for a goal similar to dry-stone walling, to bring objects of arbitrary size and shape together into a mass with minimal internal voids. If the orientation and spin rate of each pellet has been measured, even orientation at the moment of collision can be taken into account.

Discharging of the pellets can be done by firing electrons at them from an electron gun, or emitting electrons from a hot or cold cathode close to the flightpath. The electron gun can fire electrons substantially parallel to and at the same speed as the pellets, so that a high capture rate results. Likewise positive ions could be fired or emitted in place of electrons to make the pellet charge more positive. Pellet charge reduction could be done as a continuous or multi-step process. Actual pellet charge (charge/mass ratio) can be measured at any point by passing the pellet stream through a known electric or magnetic field and measuring the angle of deflection of each pellet.

The basic design assumes a single accelerator tube. A vertical stack of parallel tubes, broadly comparable in size to a very long set of bookshelves, could be used. Once technical confidence has increased, it would be possible to suspend a set of 10 or more such stacks in parallel beneath the ceiling of the building, occupying most of its width, but with ~2 m headroom below. Any stack can be lowered into this space along all or part of its length for easy maintenance access. When the stack is rehoisted, small positioning motors attached to each tube fine-tune the alignment.

The sacrificial projectile could be made from supercooled ice (whose vapour pressure at cryogenic temperatures becomes utterly negligible) thus generating steam directly within the reaction chamber.

The invention claimed is:
1. An apparatus for providing an impact on a target comprising:
   an accelerator configured to launch a multiplicity of positively charged pellets;
   a target;
   an interval of vacuum separating the accelerator from the target;
   wherein the accelerator is configured to launch pellets at times and with velocities such that at least some pellets catch up into close proximity with earlier launched pellets during transit of the vacuum interval to strike the target as a group;
   at least one measurement station configured and adapted to measure the positions of individual pellets at one or more points along the interval of vacuum after leaving the accelerator, the measurement station comprising a computerized system configured to assign a coordinate value to each pellet, the assigned coordinates usable to determine any course adjustment required for each of the plurality of pellets;
   at least one adjusting station positioned downstream from at least one measurement station, the adjusting station configured to individually adjust the courses of pellets after measurement at the measurement station.

2. The apparatus as in claim 1, wherein the adjusting station provides a course change to at least some of the pellets, the adjusting station comprising a plurality of rapidly switched electrodes providing electric fields of brief duration as a pellet passes in their vicinity, the electrodes utilizing the charge of the pellets to adjust the courses of the pellets.

3. The accelerator as in claim 1, wherein the accelerator is a linear accelerator and the pellets are launched in a substantially parallel direction.

4. A method of providing an impact upon a target, comprising the steps of:
   providing an accelerator configured to launch a multiplicity of charged pellets, a target and an interval of vacuum separating the accelerator from the target;
   launching pellets from the accelerator at times and with velocities such that at least some pellets catch up into close proximity with earlier launched pellets during transit of the vacuum interval to strike the target as a group;
   measuring positions of individual pellets at measurement stations positioned at one or more points along the interval of vacuum after leaving the accelerator, the measurement station comprising a computerized system configured to assign a coordinate value to each pellet, the assigned coordinates usable to determine any course adjustment required for each of the plurality of pellets;
   individually adjusting the courses of pellets after measurement at a measurement station by an adjusting station positioned downstream from the measurement station.

5. A method as in claim 4, wherein at least some pellets collide with one another before reaching the target to form a conglomeration whose density is at least twice the uncompressed density of the pellets.

6. A method as in claim 4, wherein the charge on at least some pellets is progressively reduced at more than one point after they emerge from the accelerator.

7. The method as in claim 4, further comprising the step of impacting the pellets on a portion of the target, the impact causing that portion to heat to the point where it radiates energy, said radiation energy evaporating an outer layer of a second portion of the target, said evaporation producing a reactive force which compresses the remainder of said second portion.

8. A method as in claim 4, wherein the pellets are composed of material whose average atomic weight is similar to the average atomic weight of the portion of the target which they initially impact.

9. A method as in claim 4, wherein fusion results.

10. The method as in claim 4 further comprising the step of compressing intensely at least a portion of the target.

11. The method as in claim 10 further comprising the step of striking a first portion of the target by the pellets, the striking causing a heating of the first portion to a temperature such that energy is radiated, the radiated energy being sufficient to evaporate an outer layer of a second portion of the target, the evaporation producing a reactive force, compressing a remainder of the second portion.

* * * * *